United States Patent
Huska

(10) Patent No.: US 6,659,043 B1
(45) Date of Patent: Dec. 9, 2003

(54) AQUARIUM WATER CIRCULATION SYSTEM

(76) Inventor: Gerard P. Huska, 1219 S. Ash, Independence, MO (US) 64052-2243

( * ) Notice: Subject to any disclaimer, the term of this patent is extended or adjusted under 35 U.S.C. 154(b) by 0 days.

(21) Appl. No.: 10/158,953

(22) Filed: May 31, 2002

(51) Int. Cl.[7] .............................................. A01K 63/04
(52) U.S. Cl. ...................... 119/226; 119/259; 119/227; 119/260
(58) Field of Search ................................ 119/259, 226, 119/227, 260, 261

(56) References Cited

U.S. PATENT DOCUMENTS

| | | | |
|---|---|---|---|
| 3,638,616 A | 2/1972 | Carmouche | |
| 3,759,223 A | 9/1973 | D'andrea | |
| 3,785,342 A | * 1/1974 | Rogers | 119/259 |
| 3,827,560 A | * 8/1974 | Morton | 210/169 |
| 4,807,565 A | * 2/1989 | Hawthorne | 119/262 |
| 4,944,248 A | 7/1990 | Torng | |
| 5,139,656 A | * 8/1992 | Gonnello | 210/151 |
| 5,290,437 A | 3/1994 | Lin | |
| D366,735 S | 1/1996 | Ichikawa | |
| 5,560,318 A | * 10/1996 | Yoshida et al. | 119/248 |
| 5,640,930 A | 6/1997 | Kirby | |
| 5,690,054 A | * 11/1997 | Allen | 119/259 |
| 5,849,185 A | * 12/1998 | Judy, Jr. | 210/169 |
| 6,234,113 B1 | * 5/2001 | Dor | 119/259 |

FOREIGN PATENT DOCUMENTS

AU     9528583 A  *  3/1996  .......... A01K/63/04

* cited by examiner

Primary Examiner—Charles T. Jordan
Assistant Examiner—John W. Zerr

(57) ABSTRACT

A aquarium water circulation system for facilitating removal of water and cleaning of an aquarium. The aquarium water circulation system includes a support member having a base portion. The support member has a plurality of stanchions. Each of the stanchions downwardly extends from the base portion. The stanchions are designed for supporting the base portion on a support surface. A plurality of wall members are coupled to the base portion of the support member. The plurality of wall members define a containment space. The containment space is designed for holding water and fish. The support member has at least one drain portion. The drain portion is coupled to the base portion of the support member. The drain portion is in fluid communication with the containment space whereby the drain portion is designed for draining water out of the containment space.

18 Claims, 13 Drawing Sheets

AQUARIUM WATER CIRCULATION SYSTEM

BACKGROUND OF THE INVENTION

1. Field of the Invention

The present invention relates to automatic cleaning aquariums and more particularly pertains to a new aquarium water circulation system for facilitating removal of water and cleaning of an aquarium.

2. Description of the Prior Art

The use of automatic cleaning aquariums is known in the prior art. U.S. Pat. No. 5,640,930 describes a system for automatically cleaning an aquarium. Another type of automatic cleaning aquarium is U.S. Pat. No. 5,290,437 having a drum filter positioned in the bottom of fishpond for filtering the water in the fishpond as the water is pumped back into the fishpond. Another type of automatic cleaning aquarium is U.S. Pat. No. 4,944,248 having a tank with a mesh shelf positioned above the bottom of the tank. A tube extends through the fish tank and has nozzles which are used to suck debris from the water below the mesh shelf.

Another type of automatic cleaning aquarium is U.S. Pat. No. 3,759,223 having an aquarium with bottom recessed to form a septic sump to collect sediment to be drained through drain spigot in the side of the aquarium. Another type of automatic cleaning aquarium is U.S. Pat. No. 3,638,616 having an aquarium with a screen disposed in the aquarium to bisect the aquarium into separate levels to allow waste to be collected and drained out of the aquarium. Another type of automatic cleaning aquarium is U.S. Pat. No. Des. 366,735 having an aquarium.

While these devices fulfill their respective, particular objectives and requirements, the need remains for a system that has certain improved features that allow for larger quantities of water to be drained without creating sizable currents and whirlpools in the water.

SUMMARY OF THE INVENTION

The present invention meets the needs presented above by having a valve assembly coupled to the drain portion to regulate the rate at which the water is being drained from the containment space. The location of the filter after the valve assembly ensures that the rate of water being drawn from the containment space is sufficient to draw debris through the gravel. A plurality of drain portions can be provided for larger containment spaces to allow water draining from the containment space to spread out to prevent formation of whirlpools that may harm fish.

Still yet another object of the present invention is to provide a new aquarium water circulation system that allows a user to facilitate draining of water from the containment space.

Even still another object of the present invention is to provide a new aquarium water circulation system that allows a user to set up a regulated and continual filtration of the water in the containment space with or without the use of an electric pump.

To this end, the present invention generally comprises a support member having a base portion. The support member has a plurality of stanchions. Each of the stanchions downwardly extends from the base portion. The stanchions are designed for supporting the base portion on a support surface. A plurality of wall members are coupled to the base portion of the support member. The plurality of wall members define a containment space. The containment space is designed for holding water and fish. The support member has at least one drain portion. The drain portion is coupled to the base portion of the support member. The drain portion is in fluid communication with the containment space whereby the drain portion is designed for draining water out of the containment space.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
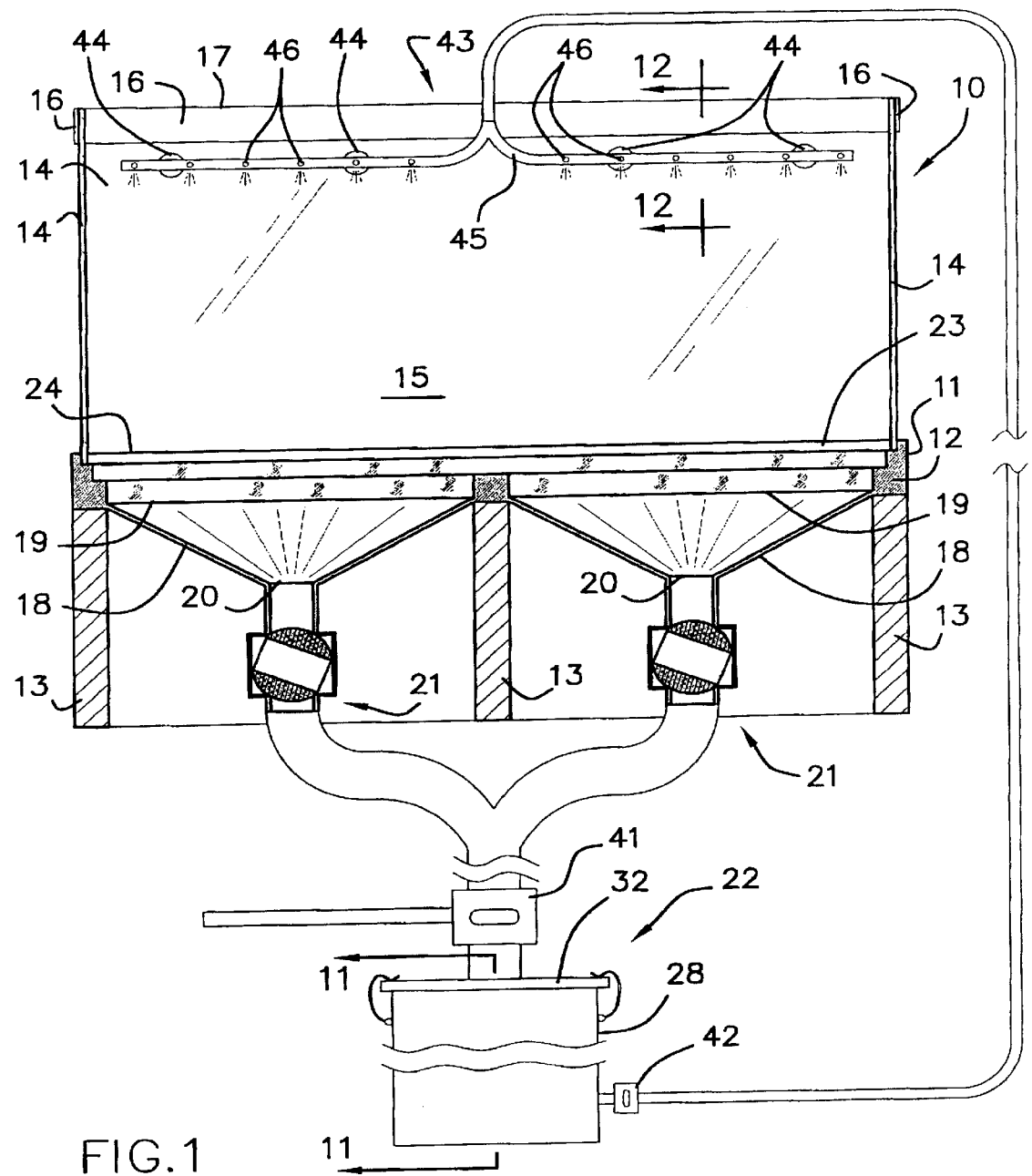
FIG. 1 is a partial cross-sectional view of a new aquarium water circulation system according to the present invention.
Figure 2:
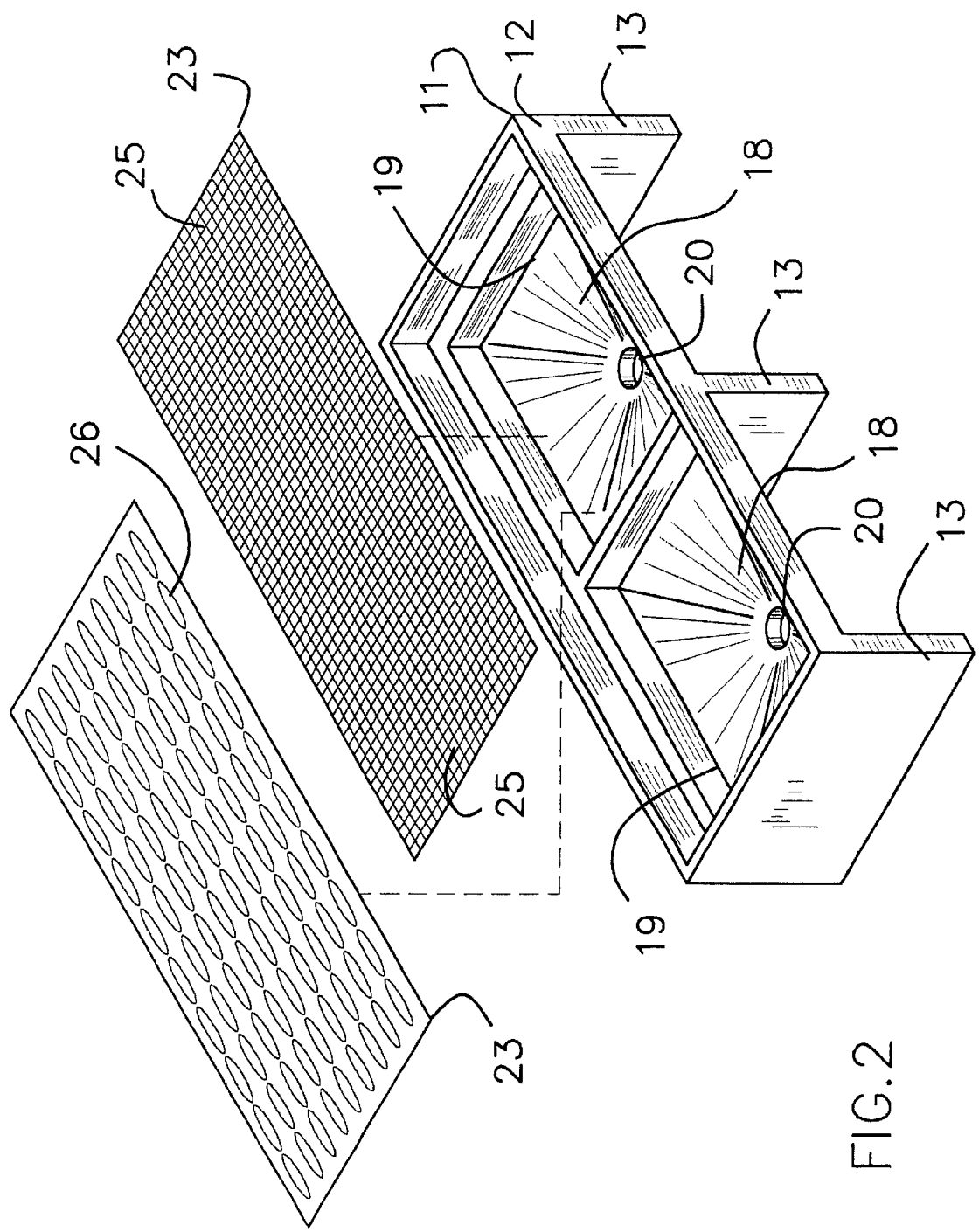
FIG. 2 is an exploded perspective view of the support member and the embodiments of the screen member of the present invention.
Figure 3:
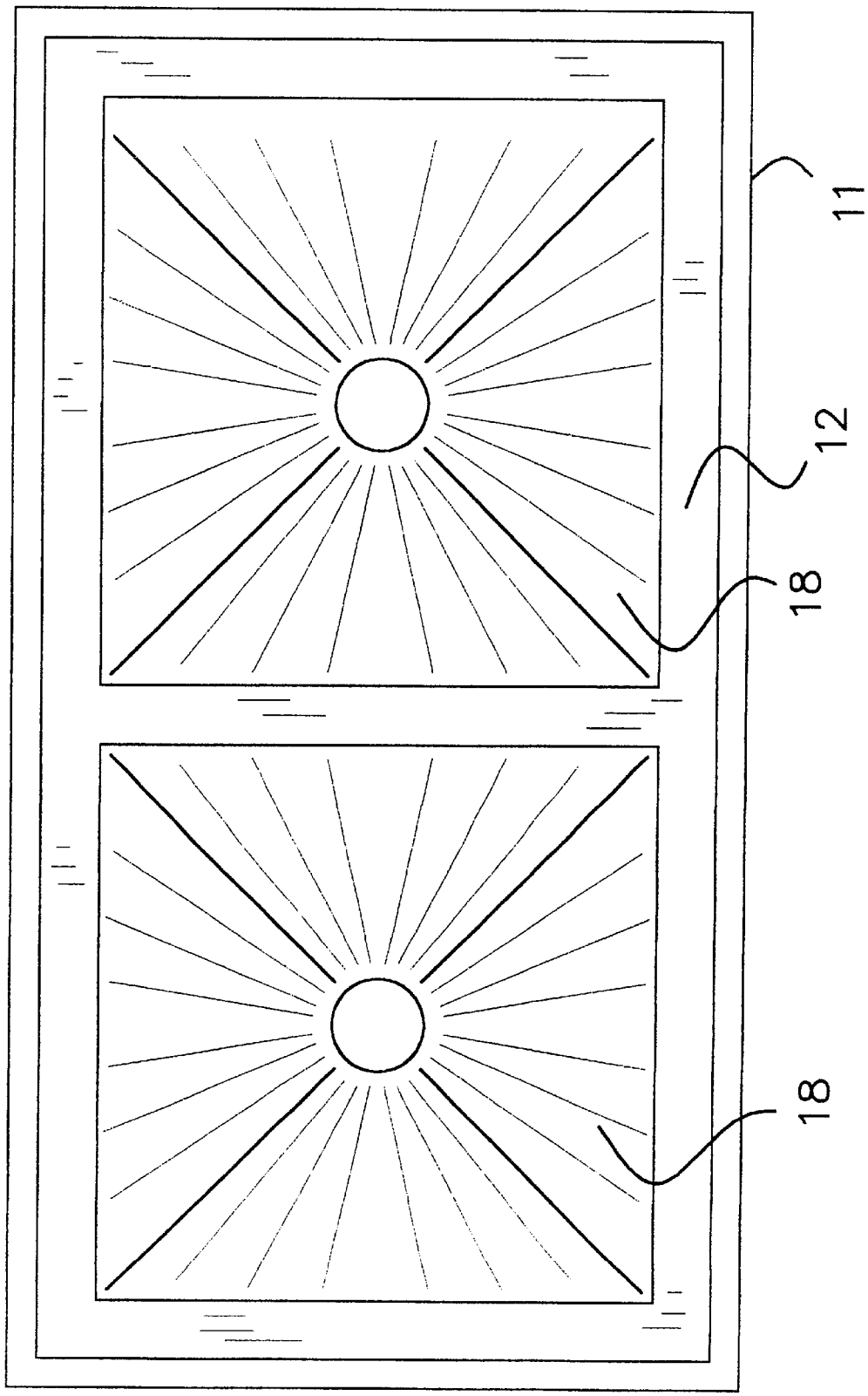
FIG. 3 is a top view of the support member of the present invention.
Figure 4:
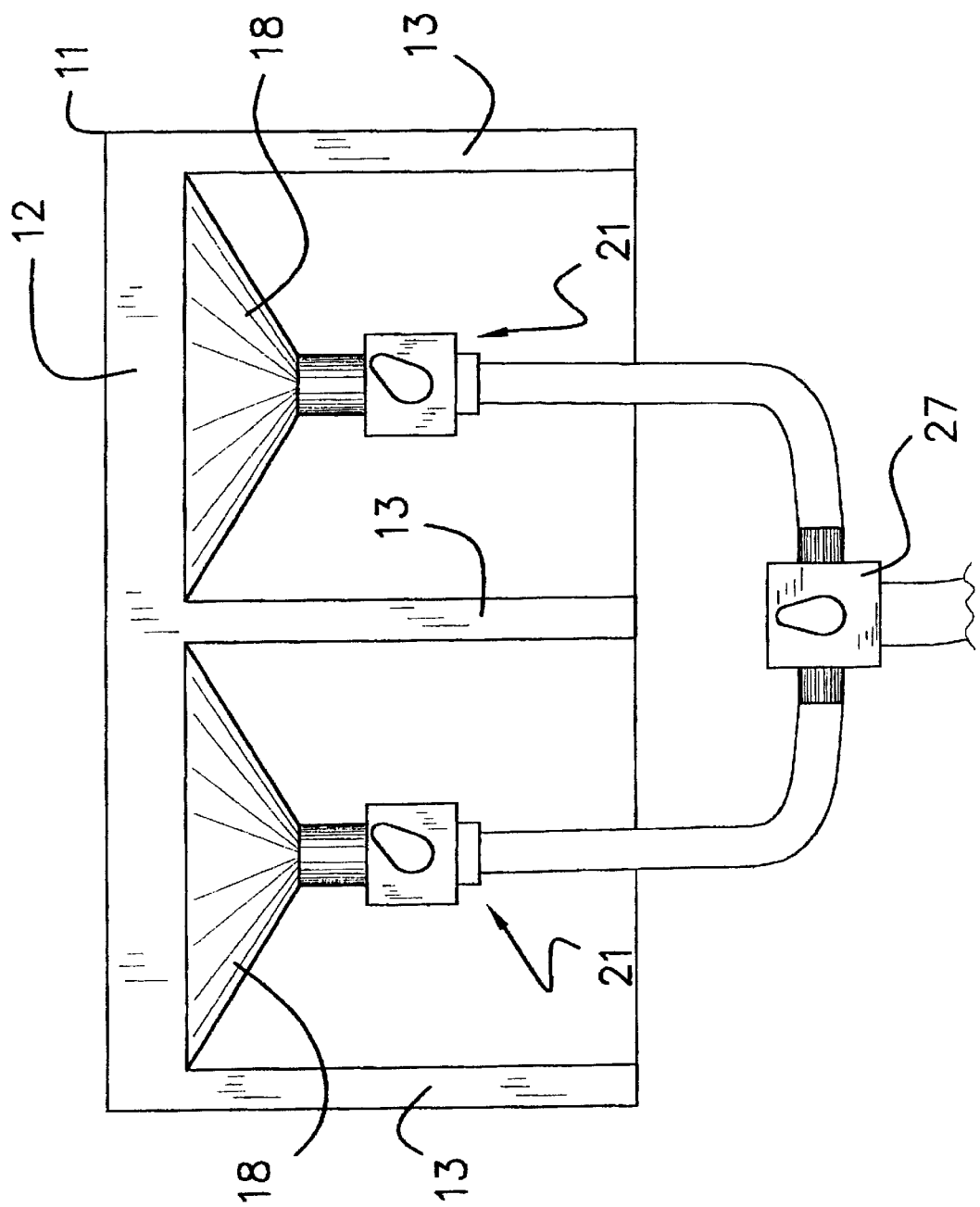
FIG. 4 is a side view of an embodiment of the support member and the collective valve member of the present invention.
Figure 5:
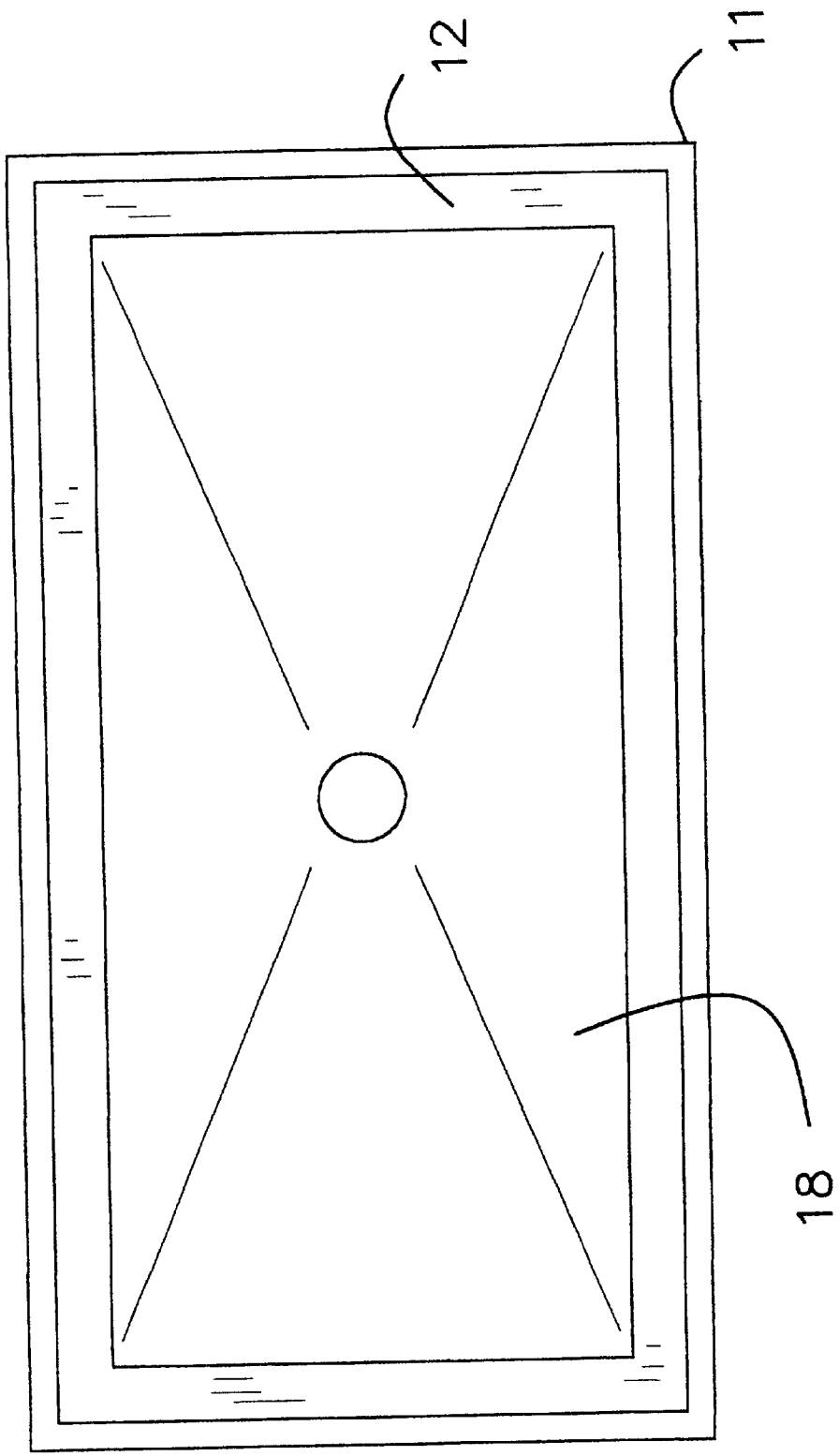
FIG. 5 is a top view of an embodiment of the support member of the present invention showing a single drain portion.
Figure 6:
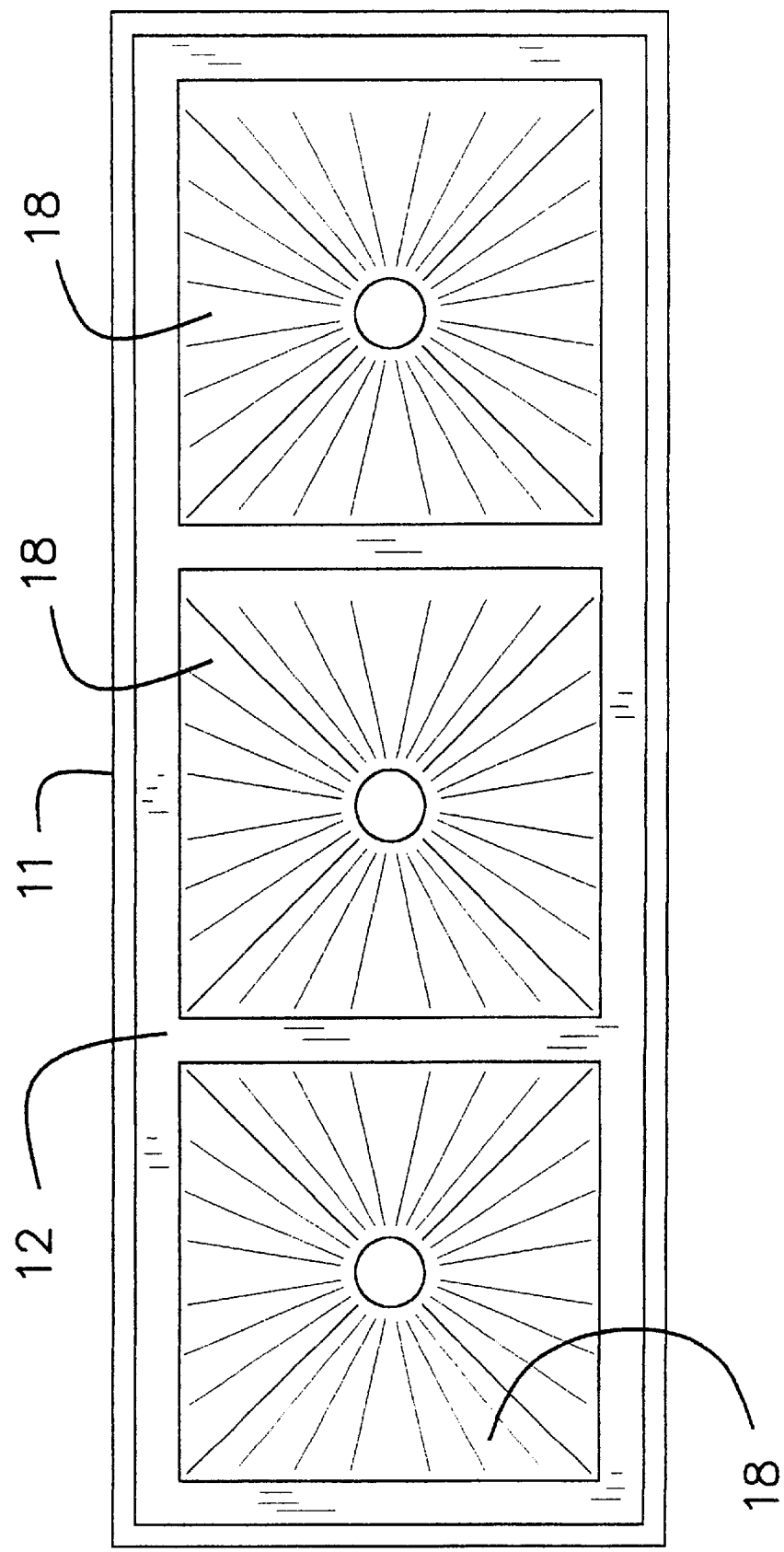
FIG. 6 is a top view of an embodiment of the support member of the present invention showing three drain portions.
Figure 7:
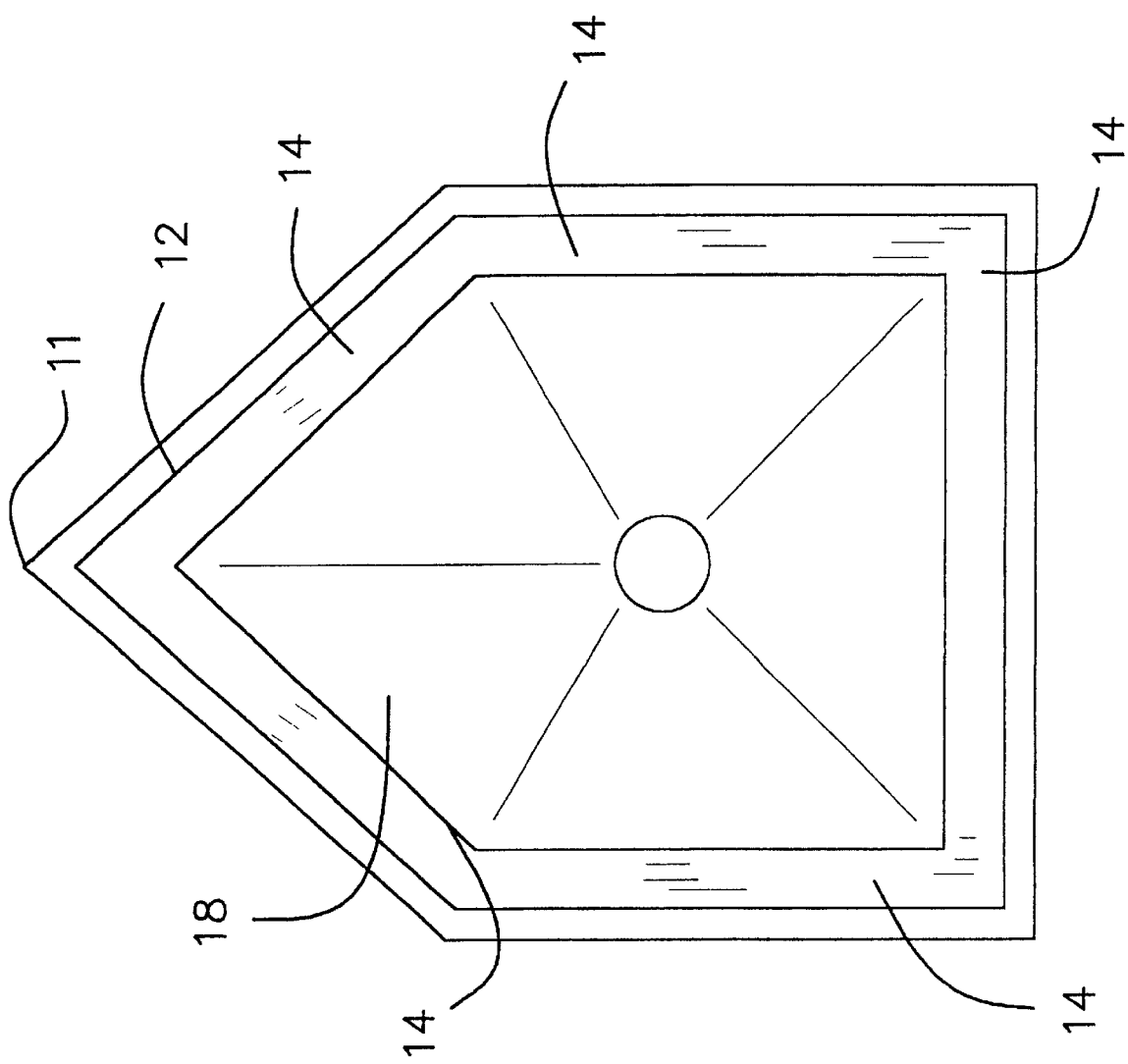
FIG. 7 is a top view of the support member and wall members of the present invention shown in alternate configuration.
Figure 8:
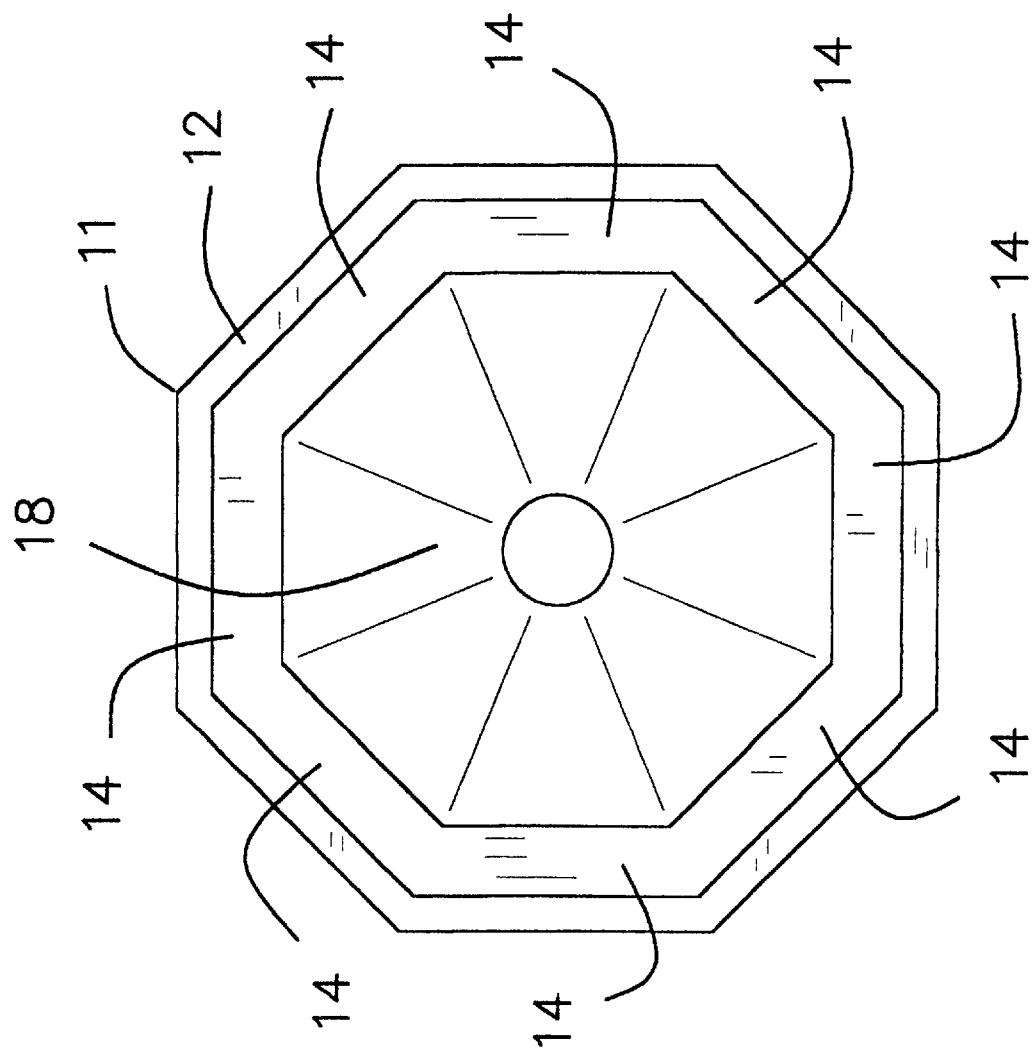
FIG. 8 is a top view of the support member and wall members of the present invention shown in alternate configuration.
Figure 9:
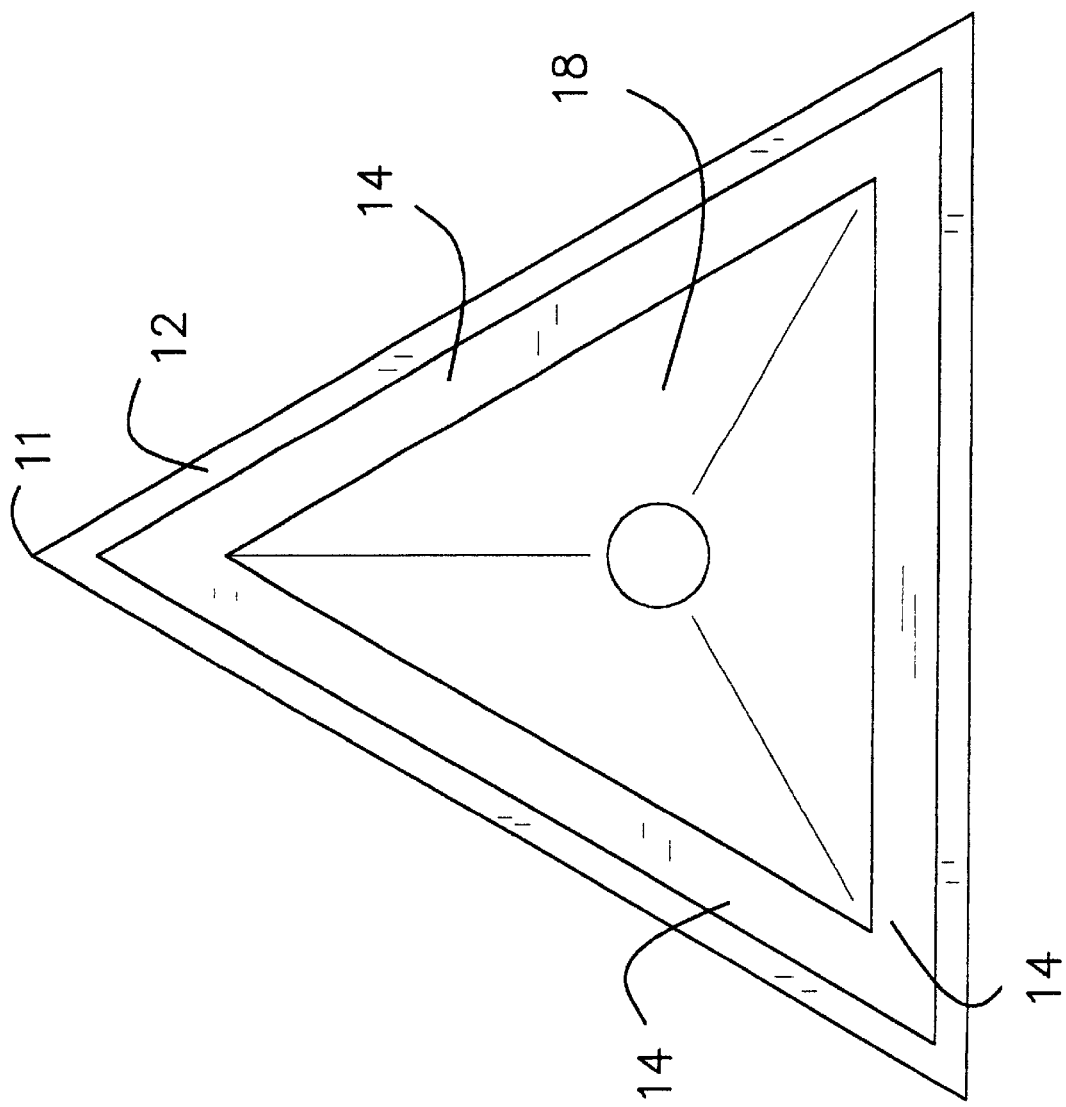
FIG. 9 is a top view of the support member and wall members of the present invention shown in alternate configuration.
Figure 10:
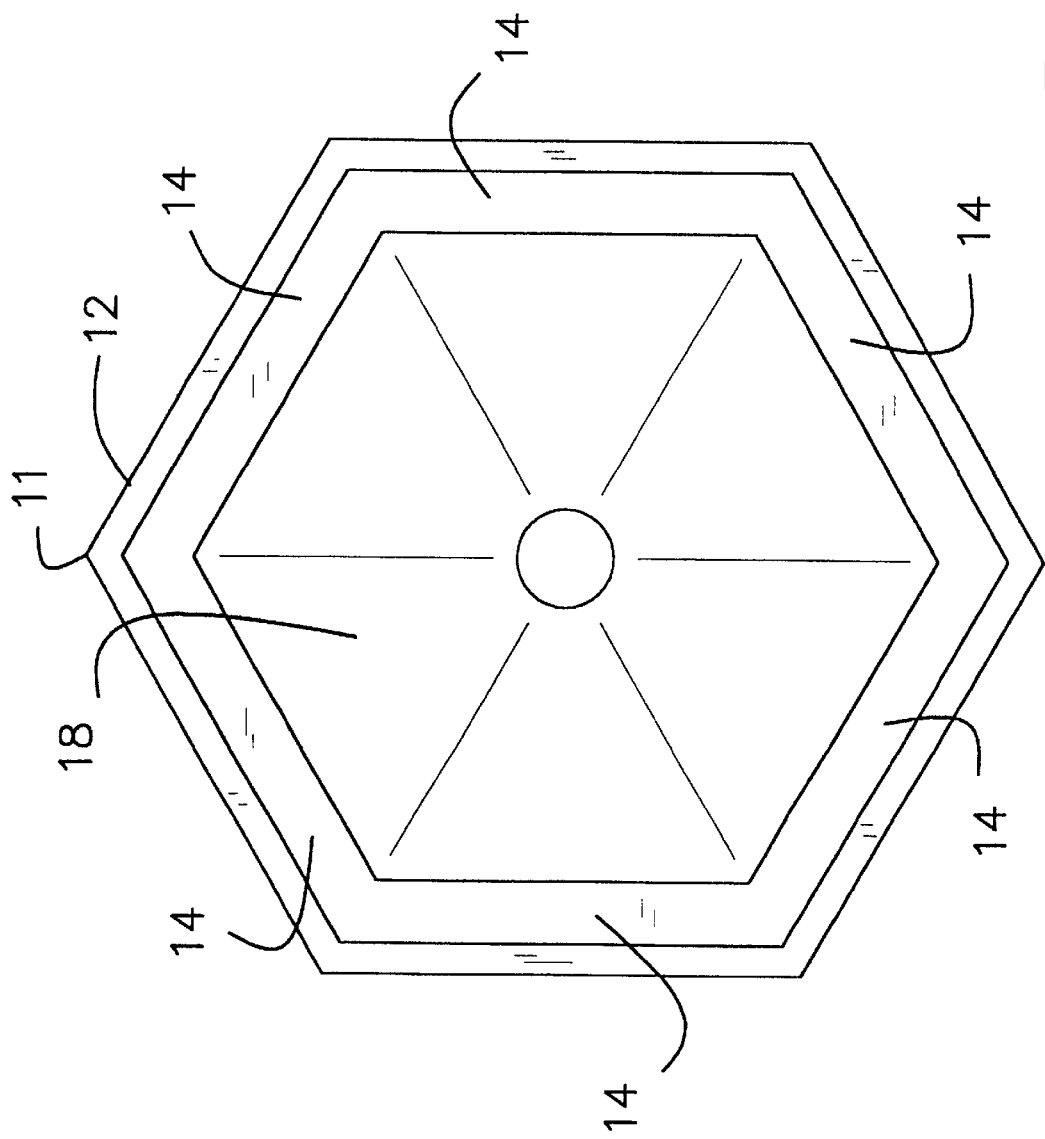
FIG. 10 is a top view of the support member and wall members of the present invention shown in alternate configuration.
Figure 11:
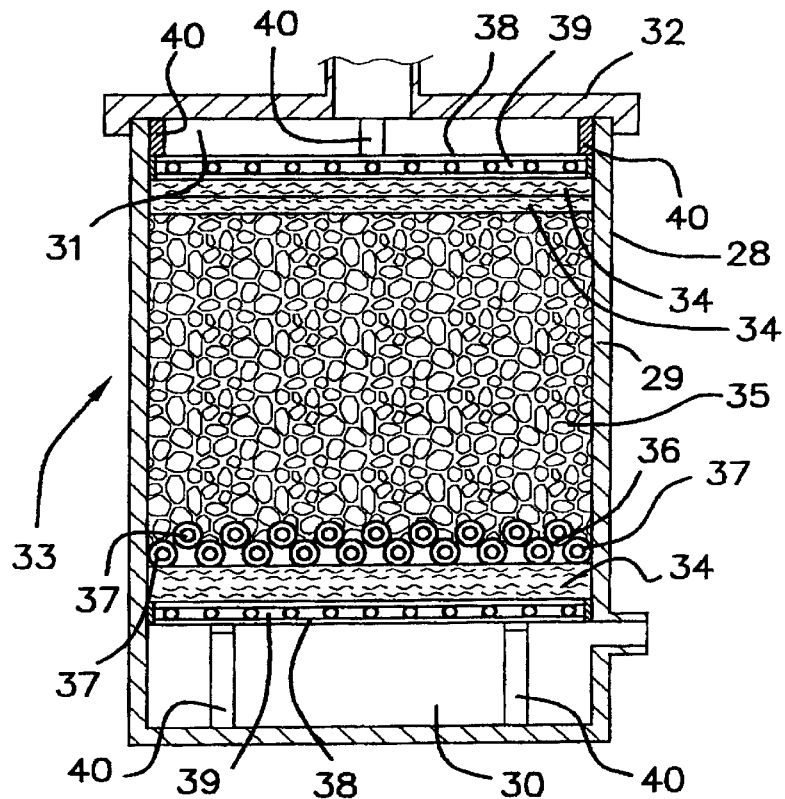
FIG. 11 is a cross-sectional view of the filter portion of the present invention as taken along line 11—11 of FIG. 1.
Figure 12:
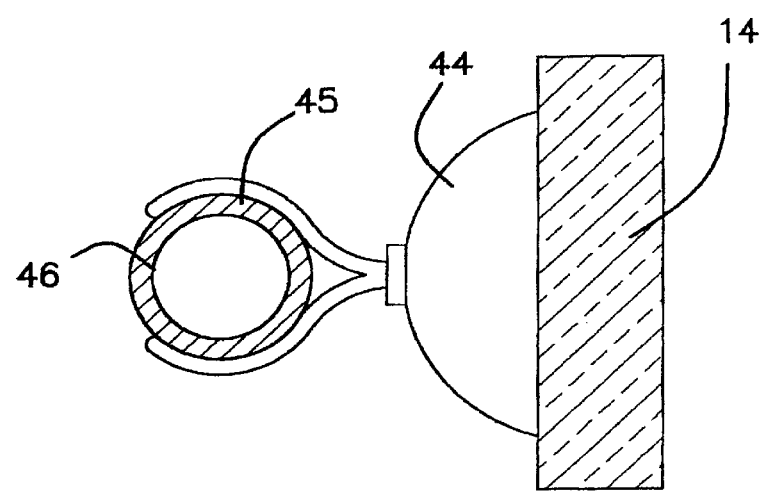
FIG. 12 is a cross-sectional view of the dispensing assembly of the present invention as taken along line 12—12 of FIG. 1.
Figure 13:
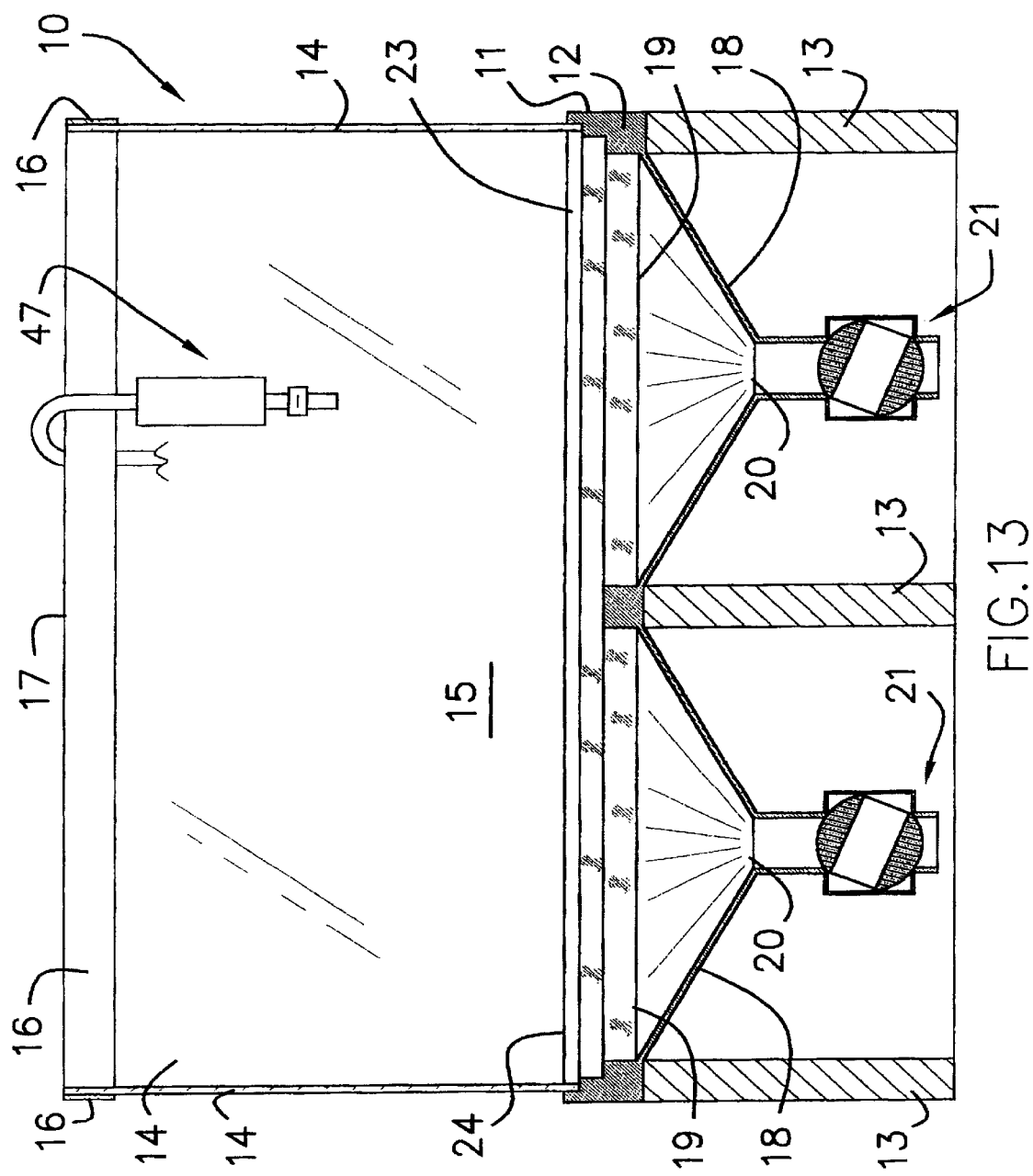
FIG. 13 is a cross-sectional view of the present invention showing the filling assembly positioned for filling the containment space.
Figure 14:
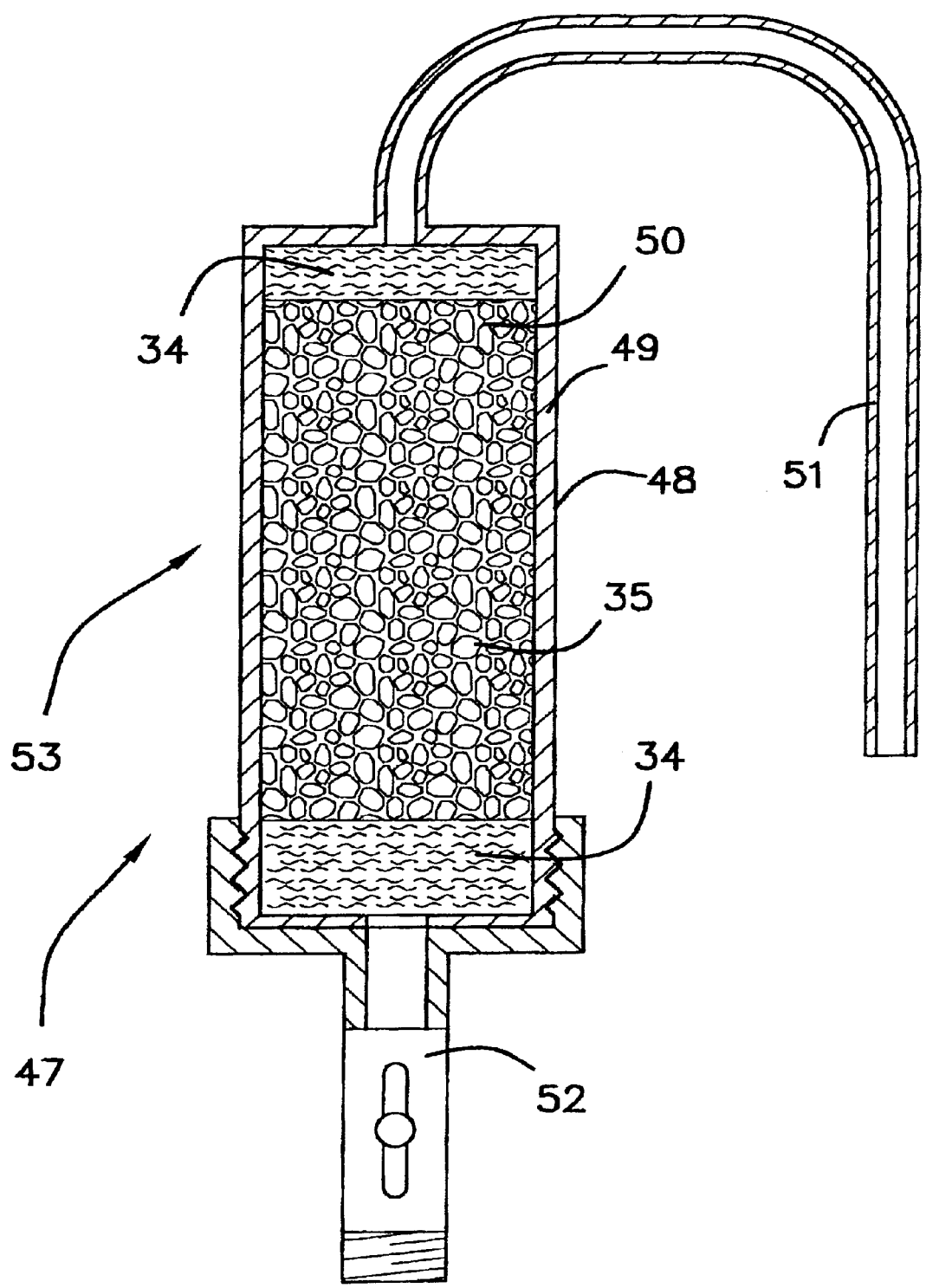
FIG. 14 is a cross-sectional view of the filling assembly of the present invention.

With reference now to the drawings, and in particular to FIGS. 1 through 14 thereof, a new aquarium water circulation system embodying the principles and concepts of the present invention and generally designated by the reference numeral 10 will be described.

As best illustrated in FIGS. 1 through 14, the aquarium water circulation system 10 generally comprises a support member 11 having a base portion 12. The support member 11 has a plurality of stanchions 13. Each of the stanchions 13 downwardly extends from the base portion 12. The stanchions 13 are designed for supporting the base portion 12 on a support surface. The support member 11 has a height of about 4 to 4 ½ inches.

A plurality of wall members 14 are coupled to the base portion 12 of the support member 11. The plurality of wall members 14 define a containment space 15. The containment space 15 is designed for holding water and fish. As shown in FIGS. 7 through 10 the support member 11 and wall members 14 can be configured in a variety of shapes to create aquariums with distinct shapes. The wall members 14 should be imbedded into the base portion 12 of the support member 11 a minimum of ½ inch and sealed to prevent loss of water and provide support for the wall members 14. A band 16 may be included adjacent to a top edge 17 of the wall members 14 to further ensure that the wall members 14 do not separate and release the water within the containment space 15. The band 16 has a height of about 2 inches. All junctions between the wall members 14 and the support member 11 should be sealed with a silicon sealer or like derivative to prevent water loss from the containment space 15.

The support member 11 has a plurality of drain portions 18. Each of the drain portions 18 is coupled to the base portion 12 of the support member 11. The drain portions 18 are in fluid communication with the containment space 15 whereby the drain portions 18 are designed for draining water out of the containment space 15. The number of drain portions 18 to be used can be dependent on the amount of gallons of water to be held in the containment space 15, for example, a singe drain portion 18 for 10 to 50 gallons of water, two drain portions 18 for 50 to 100 gallons, and 3 drain portions 18 for 100 to 200 gallons. The use of multiple drain portions 18 allows water to drain from the larger containment space 15 evenly without providing major currents and whirlpools.

Each of the drain portions 18 has an open upper end 19 and an open free end 20. The open upper end 19 has a greater area than the open free end 20 whereby each of the drain portions 18 are substantially funnel shaped. The open upper end 19 is positioned adjacent the base portion 12 of the support member 11.

Each of the drain portions 18 of the support member 11 has a valve assembly 21. The valve assembly 21 is positioned at the open free end 20 of an associated one of the drain portions 18 opposite the base portion 12 of the support member 11. The valve assembly 21 of each of the drain portions 18 is designed for selectively controlling draining of the water from the containment space 15 defined by the wall members 14.

A screen member 23 is selectively positionable on the base portion 12 of the support member 11. The screen member 23 is positioned adjacent to a bottom end 24 of the containment space 15. The screen member 23 is designed for supporting gravel and aquarium decorations placed within the containment space 15 defined by the wall members 14 whereby the screen member 23 is designed for preventing the gravel, plants and aquarium decorations from falling into the drain portions 18.

The screen member 23 has a plurality of apertures 25. Each of the apertures 25 extends through the screen member 23. The apertures 25 are designed for permitting water within the containment space 15 to drain into the drain portions 18 while keeping the gravel and the aquarium decorations positioned within the containment space 15. Thus permitting the gravel to provide some filtration of the water as the water is drained from the containment space 15.

In an embodiment, the screen member 23 has a plurality of slots 26. Each of the slots 26 extends through the screen member 23. The slots 26 are designed for permitting water within the containment space 15 to drain into the drain portion while keeping the gravel, plants and the aquarium decorations positioned within the containment space 15.

In an embodiment, a collective valve member 27 is in fluid communication between the valve assembly 21 of each of the drain portions 18 and the filter assembly 22. The collective valve member 27 is designed for providing selective control of the amount of water draining through each of the drain portions 18.

A filter assembly 22 is in fluid communication with the valve assembly 21 of each of the drain portions 18. The filter assembly 22 is in fluid communication with the containment space 15 defined by the wall members 14. The filter assembly 22 is designed for filtering water drained from the containment space 15 through the drain portions 18 of impurities before reintroducing water into the containment space 15. A gravity feed system is used to facilitate flow of water from the drain portions 18 to the filter assembly 22 and to refill the containment space 15. An optional pump filter may be in fluid communication with the drain portions 18 to facilitate flowing of the water from the drain portions 18 to refill the containment space 15.

The filter assembly 22 comprises a filtering portion 28. The filtering portion 28 comprises a perimeter wall 29 defines an interior space 30 of the filtering portion 28. The interior space 30 comprises an open top end 31 for permitting access to the interior space 30 of the filtering portion 28. The interior space 30 of the filtering portion 28 is in fluid communication with the containment space 15.

The filter assembly 22 comprises a lid member 32. The lid member 32 is selectively coupled to the filtering portion 28 whereby the lid member 32 is for selectively closing the open top end 31 of the interior space 30 of the filtering portion 28. The lid member 32 is coupled to the drain portions 18 whereby the lid member 32 permits fluid communication between the interior space 30 of the filtering portion 28 and the drain portions 18 when the lid member 32 is coupled to the filtering portion 28.

A filtration assembly 33 is selectively positionable in the interior space 30 of the filtering portion 28 of the filtering assembly. The filtration assembly 33 is designed for filtering water received from the drain portions 18. The filtration assembly 33 comprises a plurality of screening layers 34 for filtering particulate matter from the water. The screening layers 34 may comprise either a foam or fibrous material. The filtration assembly 33 comprises an activated charcoal layer 35 positioned between the screening layers 34 whereby the activated charcoal layer 35 removes chemicals, such as chloramine, chlorine and ammonia, from the water. A colony layer 36 is positioned between the activated charcoal layer 35 and a bottom most of one of the screening layers 34. The colony layer 36 comprises a plurality of ceramic tubes 37 for providing an area for bacteria to grow whereby the bacteria removes organic debris material from the water.

The filter assembly 22 comprises a pair of spacer portions 38. Each of spacer portions 38 comprises a mesh member 39 and a plurality of leg members 40. One of the spacer portions 38 is positioned in the interior space 30 of the filtering portion 28 between the lid member 32 of the filter assembly 22 and the filtration assembly 33 whereby the mesh member 39 of the associated one of the spacer portions 38 abuts the filtration assembly 33 for providing a spaced relationship between the lid member 32 and the filtration assembly 33. The other of the spacer portions 38 is positioned between a bottom wall of the filtering portion 28 and the filtration assembly 33 whereby the mesh member 39 of the associated one of the spacer portions 38 abuts the filtration assembly 33 for providing a spaced relationship between 1the bottom wall of the filtering portion 28 and the filtration assembly 33.

The filter assembly 22 comprises a diverting valve 41. The diverting valve 41 is coupled to the lid member 32. The diverting valve 41 is in fluid communication between the drain portions 18 and the lid member 32 of the filter assembly 22. The diverting valve 41 is for selectively controlling the flow of water from the drain portions 18 to the filter portion when the diverting valve 41 is actuated by the user. The diverting valve 41 is designed for diverting water away from the filtering portion 28 for disposing of water from the drain portions 18 when the diverting valve 41 is actuated by the user.

The filter assembly 22 comprises a control valve 42. The control valve 42 is coupled to the filtering portion 28 whereby the control valve 42 is in fluid communication between the filtering portion 28 of the filter assembly 22 and the containment space 15. The control valve 42 is designed for controlling the flow of water from the filtering portion 28 of the filter assembly 22 to the containment space 15 when the control valve 42 is actuated by the user.

The filter assembly 22 comprises a dispensing assembly 43. The dispensing assembly 43 is in fluid communication with the drain portions 18. The dispensing assembly 43 comprises a plurality of mounting portions 44 and a dispersal portion 45. The dispersal portion 45 is in fluid communication with the drain portions 18 whereby bores 46 in the dispersal portion 45 distribute water from the drain portions 18 to the containment space 15. Each of the mounting portions 44 is coupled to the dispersal portion 45. Each of the mounting portions 44 selectively engages one of the wall members 14 for positioning the dispersal portion 45 in the containment space 15.

A filling assembly 47 selectively engages one of the wall members 14 whereby the filling assembly 47 is in fluid communication with the containment space 15. The filling assembly 47 is designed for fluidly coupling to a water supply whereby the filling assembly 47 is designed for facilitating filling of the containment space 15 with water from the water supply. The filling assembly 47 comprises a housing 48 having a peripheral wall 49. The peripheral wall 49 of the housing 48 defines a fluid space 50 of the housing 48 whereby the fluid space 50 is for providing fluid communication between the containment space 15 and the water supply. The filling assembly 47 comprises an exit conduit 51 in fluid communication with the fluid space 50 for providing fluid communication between the fluid space 50 and the containment space 15. The exit conduit 51 is positionable over one of the wall members 14 for supporting the housing 48 from the wall member 14 when the containment space 15 is being filled with water. The filling assembly 47 comprises a supply valve 52 coupled to the housing 48 whereby the supply valve 52 is in fluid communication between the fluid space 50 and the water supply. The supply valve 52 being designed for controlling the flow of water from the water supply to the fluid space 50 of the housing 48.

A cleaning assembly 53 is positioned in the filling assembly 47 whereby the cleaning assembly 53 is designed for being in fluid communication with water from the water supply. The cleaning assembly 53 is positioned in the fluid space 50 of the housing 48 of the filler assembly. The cleaning assembly 53 is designed for removing contaminants and chemicals from the water being supplied to the containment space 15 from the water supply. The cleaning assembly 53 comprises the screening layers 34 and activated charcoal layers 35 of the filtration assembly 33 where by the activated charcoal layer 35 is positioned between a pair of screening layers 34.

In use, the user sets the support member 11 with the attached wall members 14 onto a support surface. The screen member 23 is then place along the bottom end 24 of the containment space 15 formed by the wall members 14. Gravel, plants and other aquarium decorations are then placed on top of the screen member 23. The user then assures that the valve assemblies are closed and fills the containment space 15 with water and introduces fish into the water. The valve assemblies can then be opened to allow water to drain from the containment space 15 and through the drain portions 18 and through the filter assembly 22 to filter the water being drained out of the containment space 15 and reintroduced into the containment space 15.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An aquarium water circulation system comprising:
    a support member having a base portion, said support member having a plurality of stanchions, each of said stanchions downwardly extending from said base portion, said stanchions being adapted for supporting said base portion on a support surface;
    a plurality of wall members being coupled to said base portion of said support member, said plurality of wall members defining a containment space, said containment space being adapted for holding water and fish;
    said support member having a plurality of drain portions, each of said drain portions being coupled to said base portion of said support member, said drain portions being in fluid communication with said containment space such that said drain portions are adapted for draining water out of said containment space; and
    a collective valve member being in fluid communication with a valve assembly of each of said drain portions, said collective valve member being adapted for providing selective control of the amount of water draining through each of said drain portions.

2. The aquarium water circulation system as set forth in claim 1, further comprising:
    a screen member being selectively positionable on said base portion of said support member, said screen member being positioned adjacent to a bottom end of said containment space, said screen member being adapted for supporting gravel and aquarium decorations placed within said containment space defined by said wall members such that said screen member is adapted for preventing the gravel and aquarium decorations from falling into said drain portion.

3. The aquarium water circulation system as set forth in claim 2, further comprising:

said screen member having a plurality of apertures, each of said apertures extending through said screen member, said apertures being adapted for permitting water within said containment space to drain into said drain portion while keeping the gravel and the aquarium decorations positioned within said containment space.

4. The aquarium water circulation system as set forth in claim 2, further comprising:

said screen member having a plurality of slots, each of said slots extending through said screen member, said slots being adapted for permitting water within said containment space to drain into said drain portion while keeping the gravel and the aquarium decorations positioned within said containment space.

5. The aquarium water circulation system as set forth in claim 1, further comprising:

a filter assembly being in fluid communication with said drain portion, said filter assembly being in fluid communication with said containment space defined by said wall members, said filter assembly being adapted for filtering water drained from said containment space through said drain portion of impurities before reintroducing water into said containment space.

6. The aquarium water circulation system as set forth in claim 1, further comprising:

each of said drain portions having an open upper end and an open free end, said open upper end having a greater area than said open free end such that each of said drain portions are substantially funnel shaped, said open upper end being positioned adjacent said base portion of said support member.

7. The aquarium water circulation system as set forth in claim 1, further comprising:

said valve assembly of each of said drain portions being positioned at an open free end of an associated one of said drain portions opposite said base portion of said support member, said valve assembly being adapted for selectively controlling draining of the water from said containment space defined by said wall members.

8. The aquarium water circulation system as set forth in claim 1, further comprising:

a filter assembly being in fluid communication with said drain portions, said filter assembly being in fluid communication with said containment space defined by said wall members, said filter assembly being adapted for filtering water drained from said containment space through said drain portions of impurities before reintroducing water into said containment space.

9. The aquarium water circulation system as set forth in claim 8, further comprising:

said filter assembly comprising a filtering portion, said filtering portion comprising a perimeter wall defining an interior space of said filtering portion, said interior space comprising an open top end for permitting access to said interior space of said filtering portion, said interior space of said filtering portion being in fluid communication with said containment space;

said filter assembly comprising a lid member, said lid member being selectively coupled to said filtering portion such that said lid member is for selectively closing said open top end of said interior space of said filtering portion, said lid member being coupled to said drain portions such that said lid member permits fluid communication between said interior space of said filtering portion and said drain portions when said lid member is coupled to said filtering portion; and a filtration assembly being selectively positionable in said interior space of said filtering portion of said filtering assembly, said filtration assembly being adapted for filtering water received from said drain portions.

10. The aquarium water circulation system as set forth in claim 9, further comprising:

said filter assembly comprising a pair of spacer portions, each of said spacer portions comprising a mesh member and a plurality of leg members, one of said spacer portions being positioned in said interior space of said filtering portion between said lid member of said filter assembly and said filtration assembly such that said mesh member of the associated one of said spacer portions abuts said filtration assembly for providing a spaced relationship between said lid member and said filtration assembly, the other of said spacer portions being positioned between a bottom wall of said filtering portion and said filtration assembly such that said mesh member of the associated one of said spacer portions abuts said filtration assembly for providing a spaced relationship between said bottom wall of said filtering portion and said filtration assembly.

11. The aquarium water circulation system as set forth in claim 9, further comprising:

said filter assembly comprising a diverting valve, said diverting valve being coupled to said lid member, said diverting valve being in fluid communication between said drain portions and said lid member of said filter assembly, said diverting valve being for selectively controlling the flow of water from said drain portions to said filter portion when said diverting valve is actuated by the user, said diverting valve being adapted for diverting water away from said filtering portion for disposing of water from said drain portions when said diverting valve is actuated by the user.

12. The aquarium water circulation system as set forth in claim 9, further comprising:

said filter assembly comprising a control valve, said control valve being coupled to said filtering portion such that said control valve is in fluid communication between said filtering portion of said filter assembly and said containment space, said control valve being adapted for controlling the flow of water from said filtering portion of said filter assembly to said containment space when said control valve is actuated by the user.

13. The aquarium water circulation system as set forth in claim 8, further comprising:

said filter assembly comprising a dispensing assembly, said dispensing assembly being in fluid communication with said drain portions, said dispensing assembly comprising a plurality of mounting portions and a dispersal portion, said dispersal portion being in fluid communication with said drain portions such that bores in said dispersal portion distribute water from said drain portions to said containment space, each of said mounting portions being coupled to said dispersal portion, each of said mounting portions selectively engaging one of said wall members for positioning said dispersal portion in said containment space.

14. The aquarium water circulation system as set forth in claim 1, further comprising:

a filling assembly selectively engaging one of said wall members such that said filling assembly is in fluid communication with said containment space, said filling assembly being adapted for fluidly coupling to a water supply such that said filling assembly is adapted for facilitating filling of said containment space with water from the water supply; and a cleaning assembly being positioned in said filling assembly such that said cleaning assembly is adapted for being in fluid communication with water from the water supply, said cleaning assembly being adapted for removing contaminants and chemicals from the water being supplied to said containment space from the water supply.

15. An aquarium water circulation system comprising:

a support member having a base portion, said support member having a plurality of stanchions, each of said stanchions downwardly extending from said base portion, said stanchions being adapted for supporting said base portion on a support surface;

a plurality of wall members being coupled to said base portion of said support member, said plurality of wall members defining a containment space, said containment space being adapted for holding water and fish;

said support member having a plurality of drain portions, each of said drain portions being coupled to said base portion of said support member, said drain portions being in fluid communication with said containment space such that said drain portions are adapted for draining water out of said containment space;

each of said drain portions having an open upper end and an open free end, said open upper end having a greater area than said open free end such that each of said drain portions are substantially funnel shaped, said open upper end being positioned adjacent said base portion of said support member;

each of said drain portions of said support member having a valve assembly, said valve assembly being positioned at said open free end of an associated one of said drain portions opposite said base portion of said support member, said valve assembly of each of said drain portions being adapted for selectively controlling draining of the water from said containment space defined by said wall members;

a filter assembly being in fluid communication with said valve assembly of each of said drain portions, said filter assembly being in fluid communication with said containment space defined by said wall members, said filter assembly being adapted for filtering water drained from said containment space through said drain portions of impurities before reintroducing water into said containment space;

a screen member being selectively positionable on said base portion of said support member, said screen member being positioned adjacent to a bottom end of said containment space, said screen member being adapted for supporting gravel and aquarium decorations placed within said containment space defined by said wall members such that said screen member is adapted for preventing the gravel and aquarium decorations from falling into said drain portions;

said screen member having a plurality of apertures, each of said apertures extending through said screen member, said apertures being adapted for permitting water within said containment space to drain into said drain portions while keeping the gravel and the aquarium decorations positioned within said containment space;

said filter assembly comprising a filtering portion, said filtering portion comprising a perimeter wall defining an interior space of said filtering portion, said interior space comprising an open top end for permitting access to said interior space of said filtering portion, said interior space of said filtering portion being in fluid communication with said containment space;

said filter assembly comprising a lid member, said lid member being selectively coupled to said filtering portion such that said lid member is for selectively closing said open top end of said interior space of said filtering portion, said lid member being coupled to said drain portions such that said lid member permits fluid communication between said interior space of said filtering portion and said drain portions when said lid member is coupled to said filtering portion;

a filtration assembly being selectively positionable in said interior space of said filtering portion of said filtering assembly, said filtration assembly being adapted for filtering water received from said drain portions;

said filter assembly comprising a pair of spacer portions, each of said spacer portions comprising a mesh member and a plurality of leg members, one of said spacer portions being positioned in said interior space of said filtering portion between said lid member of said filter assembly and said filtration assembly such that said mesh member of the associated one of said spacer portions abuts said filtration assembly for providing a spaced relationship between said lid member and said filtration assembly, the other of said spacer portions being positioned between a bottom wall of said filtering portion and said filtration assembly such that said mesh member of the associated one of said spacer portions abuts said filtration assembly for providing a spaced relationship between said bottom wall of said filtering portion and said filtration assembly;

said filter assembly comprising a diverting valve, said diverting valve being coupled to said lid member, said diverting valve being in fluid communication between said drain portions and said lid member of said filter assembly, said diverting valve being for selectively controlling the flow of water from said drain portions to said filter portion when said diverting valve is actuated by the user, said diverting valve being adapted for diverting water away from said filtering portion for disposing of water from said drain portions when said diverting valve is actuated by the user;

said filter assembly comprising a control valve, said control valve being coupled to said filtering portion such that said control valve is in fluid communication between said filtering portion of said filter assembly and said containment space, said control valve being adapted for controlling the flow of water from said filtering portion of said filter assembly to said containment space when said control valve is actuated by the user;

said filter assembly comprising a dispensing assembly, said dispensing assembly being in fluid communication with said drain portions, said dispensing assembly comprising a plurality of mounting portions and a dispersal portion, said dispersal portion being in fluid communication with said drain portions such that bores in said dispersal portion distribute water from said drain portions to said containment space, each of said mounting portions being coupled to said dispersal portion, each of said mounting portions selectively engaging one of said wall members for positioning said dispersal portion in said containment space;

a filling assembly selectively engaging one of said wall members such that said filling assembly is in fluid communication with said containment space, said filling assembly being adapted for fluidly coupling to a water supply such that said filling assembly is adapted for facilitating filling of said containment space with water from the water supply; and a cleaning assembly being positioned in said filling assembly such that said cleaning assembly is adapted for being in fluid communication with water from the water supply, said cleaning assembly being adapted for removing contaminants and chemicals from the water being supplied to said containment space from the water supply.

16. The aquarium water circulation system as set forth in claim 15, further comprising:

a collective valve member being in fluid communication with said valve assembly of each of said drain portions, said collective valve member being adapted for providing selective control of the amount of water draining through each of said drain portions.

17. An aquarium water circulation system comprising:

a support member having a base portion, said support member having a plurality of stanchions, each of said stanchions downwardly extending from said base portion, said stanchions being adapted for supporting said base portion on a support surface;

a plurality of wall members being coupled to said base portion of said support member, said plurality of wall members defining a containment space, said containment space being adapted for holding water and fish;

said support member having a plurality of drain portions, each of said drain portions being coupled to said base portion of said support member, said drain portions being in fluid communication with said containment space such that said drain portions are adapted for draining water out of said containment space;

a filter assembly being in fluid communication with said drain portions, said filter assembly being in fluid communication with said containment space defined by said wall members, said filter assembly being adapted for filtering water drained from said containment space through said drain portions of impurities before reintroducing water into said containment space;

said filter assembly comprising a filtering portion, said filtering portion comprising a perimeter wall defining an interior space of said filtering portion, said interior space comprising an open top end for permitting access to said interior space of said filtering portion, said interior space of said filtering portion being in fluid communication with said containment space;

said filter assembly comprising a lid member, said lid member being selectively coupled to said filtering portion such that said lid member is for selectively closing said open top end of said interior space of said filtering portion, said lid member being coupled to said drain portions such that said lid member permits fluid communication between said interior space of said filtering portion and said drain portions when said lid member is coupled to said filtering portion;

a filtration assembly being selectively positionable in said interior space of said filtering portion of said filtering assembly, said filtration assembly being adapted for filtering water received from said drain portions; and said filter assembly comprising a diverting valve, said diverting valve being coupled to said lid member, said diverting valve being in fluid communication between said drain portions and said lid member of said filter assembly, said diverting valve being for selectively controlling the flow of water from said drain portions to said filter portion when said diverting valve is actuated by the user, said diverting valve being adapted for diverting water away from said filtering portion for disposing of water from said drain portions when said diverting valve is actuated by the user.

18. An aquarium water circulation system comprising:

a support member having a base portion, said support member having a plurality of stanchions, each of said stanchions downwardly extending from said base portion, said stanchions being adapted for supporting said base portion on a support surface;

a plurality of wall members being coupled to said base portion of said support member, said plurality of wall members defining a containment space, said containment space being adapted for holding water and fish;

said support member having a plurality of drain portions, each of said drain portions being coupled to said base portion of said support member, said drain portions being in fluid communication with said containment space such that said drain portions are adapted for draining water out of said containment space;

a filter assembly being in fluid communication with said drain portions, said filter assembly being in fluid communication with said containment space defined by said wall members, said filter assembly being adapted for filtering water drained from said containment space through said drain portions of impurities before reintroducing water into said containment space;

said filter assembly comprising a filtering portion, said filtering portion comprising a perimeter wall defining an interior space of said filtering portion, said interior space comprising an open top end for permitting access to said interior space of said filtering portion, said interior space of said filtering portion being in fluid communication with said containment space;

said filter assembly comprising a lid member, said lid member being selectively coupled to said filtering portion such that said lid member is for selectively closing said open top end of said interior space of said filtering portion, said lid member being coupled to said drain portions such that said lid member permits fluid communication between said interior space of said filtering portion and said drain portions when said lid member is coupled to said filtering portion;

a filtration assembly being selectively positionable in said interior space of said filtering portion of said filtering assembly, said filtration assembly being adapted for filtering water received from said drain portions said filter assembly comprising a control valve, said control valve being coupled to said filtering portion such that said control valve is in fluid communication between said filtering portion of said filter assembly and said containment space, said control valve being adapted for controlling the flow of water from said filtering portion of said filter assembly to said containment space when said control valve is actuated by the user.

* * * * *